United States Patent
Mandviwala

(10) Patent No.: US 9,733,381 B2
(45) Date of Patent: Aug. 15, 2017

(54) FIBER OPTIC BASED MAGNETIC SENSING APPARATUS, SYSTEMS, AND METHODS

(71) Applicant: Halliburton Energy Services, Inc., Houston, TX (US)

(72) Inventor: Tasneem A. Mandviwala, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/899,903

(22) PCT Filed: Aug. 2, 2013

(86) PCT No.: PCT/US2013/053427
§ 371 (c)(1),
(2) Date: Dec. 18, 2015

(87) PCT Pub. No.: WO2015/016941
PCT Pub. Date: Feb. 5, 2015

(65) Prior Publication Data
US 2016/0139290 A1    May 19, 2016

(51) Int. Cl.
*G01V 3/26* (2006.01)
*G01V 8/12* (2006.01)
*G01L 1/24* (2006.01)

(52) U.S. Cl.
CPC .............. *G01V 3/26* (2013.01); *G01L 1/242* (2013.01); *G01V 8/12* (2013.01)

(58) Field of Classification Search
CPC ............ G01L 1/242; G01V 3/26; G01V 8/12
See application file for complete search history.

(56) References Cited

U.S. PATENT DOCUMENTS

| | | |
|---|---|---|
| 6,998,835 B1 | 2/2006 | Brock et al. |
| 7,226,666 B2 | 6/2007 | Srinivasan |
| 7,771,846 B2 | 8/2010 | Viehland et al. |
| 2004/0196046 A1 | 10/2004 | Aidan |
| 2009/0102474 A1* | 4/2009 | Cranch ................ A01D 89/008 324/244.1 |

(Continued)

FOREIGN PATENT DOCUMENTS

WO    WO-2015016941 A1    2/2015

OTHER PUBLICATIONS

"International Application Serial No. PCT/US2013/053427, International Preliminary Report on Patentability mailed Feb. 11, 2016", 9 pgs.

(Continued)

*Primary Examiner* — David M Gray
*Assistant Examiner* — Michael Harrison
(74) *Attorney, Agent, or Firm* — Gilliam IP PLLC

(57) ABSTRACT

In some embodiments, an apparatus and a system, as well as a method and an article, may operate to acquire a monitoring output from a first distributed feedback (DFB) fiber laser sensor at least partially bonded to a piezoelectric portion of a downhole device, to demodulate the monitoring output to determine a frequency shift in a lasing frequency of the DFB fiber laser sensor, and to correlate the frequency shift to a measure of magnetic field strength to determine a strength of a downhole magnetic field. Additional apparatus, systems, and methods are disclosed.

22 Claims, 4 Drawing Sheets

(56) References Cited

U.S. PATENT DOCUMENTS

| | | |
|---|---|---|
| 2010/0085632 A1 | 4/2010 | Henderson et al. |
| 2010/0133006 A1 | 6/2010 | Shakra |
| 2011/0084696 A1 | 4/2011 | Tenghamn |
| 2014/0152995 A1* | 6/2014 | Dong ................ G01D 5/35316 356/477 |
| 2014/0222343 A1* | 8/2014 | Samson ................ G01V 3/12 702/8 |

OTHER PUBLICATIONS

"International Application Serial No. PCT/US2013/053427, International Search Report mailed Apr. 18, 2014", 3 pgs.

"International Application Serial No. PCT/US2013/053427, Written Opinion mailed Apr. 18, 2014", 7 pgs.

Dong, S., et al., "Longitudinal and transverse magnetoelectric voltage coefficients of magnetostrictive/piezoelectric laminate composite: theory", IEEE Transactions on Ultrasonics, Ferroelectrics and Frequency Control, 50(10), (2003), 1253-1261.

Ryu, J., et al., "Magnetoelectric Properties in Piezoelectric and Magnetostrictive Laminate Composites", Jpn. J. Appl. Phys., 40, (2001), 4948-4951.

* cited by examiner

FIBER OPTIC BASED MAGNETIC SENSING APPARATUS, SYSTEMS, AND METHODS

PRIORITY APPLICATION

This application is a U.S. National Stage Filing under 35 U.S.C. 371 from International Application No. PCT/US2013/053427, filed Aug. 2, 2013; and published as WO 2015/016941 on Feb. 5, 2015; which application and publication are incorporated herein by reference in their entirety.

BACKGROUND

The present disclosure addresses methods and apparatus for distributed sensing of downhole properties; and more particularly relates to sensing of such downhole properties through use of magnetic sensors optically coupled to fiber optic cable.

Understanding the structure and properties of geological formations is important for a wide variety of functions in well and or reservoir management, monitoring and/or remediation. Measurements are commonly made in a borehole or formation (i.e., down hole measurements) are to provide data to aid in attaining this understanding, to identify the composition and distribution of material that surrounds the measurement device down hole. To obtain such measurements, magnetoelectric (ME) sensors may be used.

Among other applications, monitoring systems may use these measurements to monitor reservoirs while they are being flooded with water, steam or another substance to reduce the likelihood flood breakthroughs. While some ME sensors may not be sensitive enough for use in flood monitoring, ME sensors with increased sensitivity have recently become available. However, it may be difficult for systems at the surface to interface with multiple downhole ME sensors for effective high-sensitivity flood monitoring. Furthermore, some current methods for coupling to ME sensors may not permit permanent deployment of the ME sensors throughout the life cycle of the reservoir, thus necessitating stoppage of production during flood monitoring.

DETAILED DESCRIPTION

To address some of the challenges described above, as well as others, apparatus, systems, and methods are described herein for using magnetoelectric (ME) sensors with relatively high sensitivity and permanent deployability. In addition to many other applications, (including monitoring downhole fluids in a variety of applications), the described system is useful for water (or other fluid) flood monitoring. For purposes of the present disclosure of example systems and methods, the use of ME sensors in a fiber optic system will be described in the context of systems intended for use in monitoring water flood in a reservoir, as this use is considered illustrative of the general use of the system as it can be applied for other monitoring operations.

A flood front monitoring system detects changes in a hydrocarbon reservoir over time through measurement of resistivity contrasts between the reservoir and flood-saturated zones. Magnetic field measurement systems for measuring resistivity contrasts may include a transmitter and a receiver. The transmitter generates electromagnetic waves consisting of electric and magnetic field components. These electromagnetic waves may be referred to as the primary fields. The primary field interacts with the geological formations and generates secondary fields whose properties are a function of formation resistivities. The receiver measures the total field strength, which the monitoring system converts to resistivity according to various algorithms.

In a time-lapse flood front measurement system, the monitoring system records the receiver signal when there is no flood and measurements are then taken periodically during flooding. Example embodiments may provide continuous, time-lapse measurements of magnetic fields in the reservoir so that the flood front can be continuously monitored. In example embodiments, measurements of magnetic fields may be provided by permanently deployable, quasi-distributed fiber-optic sensors (receivers).

Example embodiments may use fiber for measuring so that components may be deployed permanently within a wellbore or formation. Fiber can survive relatively harsh downhole environments, and can be deployed downhole for the life of the well. Electronic sensors, on the other hand, cannot survive in harsh environments if deployed permanently. Sensors described herein with respect to example embodiments include only passive components (i.e., with no electronic parts) and hence can be deployed permanently.

The description of example embodiments herein is related only to the sensing components for magnetic field measuring. Example embodiments are described under the assumption that permanently deployed transmitters are also available, to generate the primary field needed for the system to work as explained above.

Figure 1:
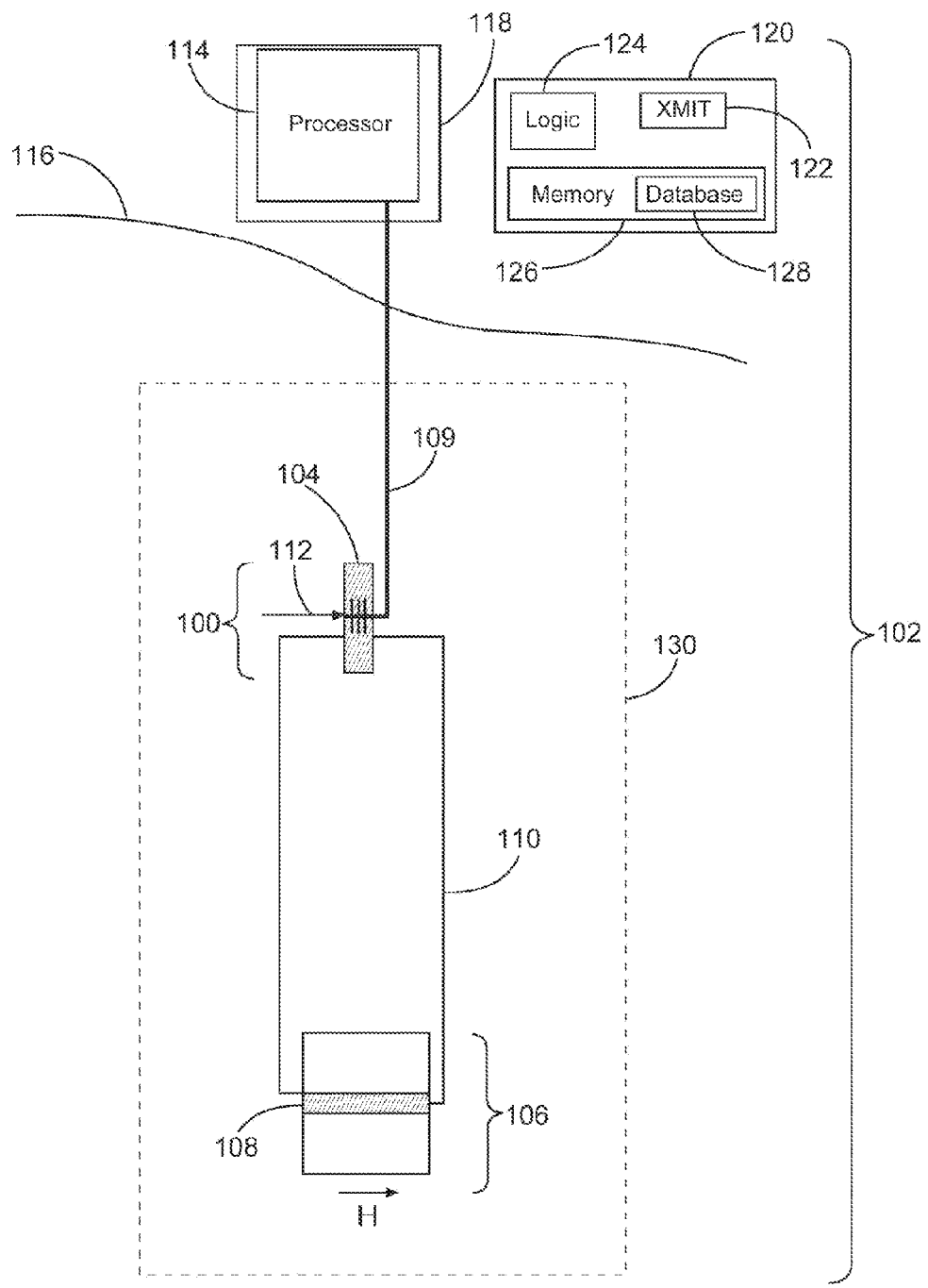
FIG. 1 is a block diagram of an example apparatus for monitoring the strength of a downhole magnetic field in accordance with some embodiments.

FIG. 1 is a block diagram of an example apparatus including a fiber optic interface 100 and an example system 102 for using that apparatus 100 to sense and monitor magnetic fields according to example embodiments.

The apparatus 100 includes a piezoelectric portion 104. The piezoelectric portion 104 may be arranged as a tube, in layers, or in any other configuration or shape.

The piezoelectric portion 104 is configured to receive a strain-induced electrical signal (e.g., voltage) from a magnetoelectric (ME) sensor 106. The electrical signal will typically be induced by strain, as described below, across electrodes of a piezo-fiber layer 108 of the ME sensor 106.

The example ME sensor 106 includes a laminate composite including a piezo-fiber layer 108 sandwiched between two layers of magnetostrictive material. As is known by those of ordinary skill in the art, magnetostrictive materials undergo strain in presence of magnetic fields. Because the layers of the laminate are stress coupled, the piezo-fiber layer 108 undergoes stress, resulting in a voltage being induced on the two electrode end faces of the piezo-fiber layer 108. This voltage is proportional to a measure of the strength of the magnetic field measured by the ME sensor 106. The piezo-fiber layer 108 is coupled to the piezoelectric portion 104 through an electrical connection 110.

The strain-induced voltage across the piezo-fiber layer 108 electrodes, when applied across the piezoelectric portion 104, will in turn induce strain in the piezoelectric portion 104. A distributed feedback (DFB) fiber laser sensor 112, attached to the piezoelectric portion 104, may be used to detect this strain.

Some references for DFB fiber laser sensors quote sensitivities for resolving strains as low as 118 fε/Hz$^{1/2}$. In some example systems, the DFB fiber laser sensor 112 includes a length of single mode, photosensitive doped fiber within which a Bragg grating is formed. In some example embodiments, the fiber may be an erbium-doped fiber (EDF). However, the fiber may be doped with other rare earth elements, for example thulium (Tm), dysprosium (Dy), praseodymium (Pr), neodymium (Nd), thorium (Th), holmium (Ho), or ytterbium (Yb).

The strain induced in the piezoelectric portion 104 bonded to DFB fiber laser sensor 112 is essentially linearly proportional to the strength of the magnetic field measured by the ME sensor 106. Thus, a strain in the DFB fiber laser sensor 112 causes a shift in the lasing frequency of the DFB fiber laser sensor 112. If the magnetic field is sinusoidal, the modulation or shift produced by the strain will be sinusoidal, and the lasing frequency will be modulated sinusoidally.

While example system 102 is depicted as including only a single apparatus 100, in other embodiments, a system will comprise a plurality of apparatus 100 each coupled to one or more ME sensors 106 through the electrical connection 110. The system 102 will also comprise a processor 114. For the purposes of this specification, a "processor" as used herein, means one or more microprocessors, microcontrollers and/or digital signal processors or other devices having the capability of running a "program" (all such devices being referred to herein as a "processor"). While a "program" is any set of executable machine code instructions, and as used herein, includes user-level applications as well as system-directed applications or daemons.

The DFB fiber laser sensor 112 may couple to a fiber optic cable 109 such that the processor 114 may receive a monitoring output from the fiber optic cable 109 representative of a modulated lasing frequency of the DFB fiber laser sensor 112. The processor 114 may correlate the modulated lasing frequency to magnetic field strength, according to known linear relationships or algorithms.

The processor 114 may be located above the surface of the Earth 116. However, example embodiments are not limited thereto. At least the apparatus 100 and the ME sensor 106 may be disposed in a housing to comprise a receiver 130 (or alternatively, may be contained within separate housings, but placed in operative communication with one another). The configuration described above with respect to example embodiments may be implemented to provide a low loss optical transmission path through the fiber optic cable 109 up to the surface, and may help avoid the need for expensive electronics downhole.

Processor(s) 114 may be part of a surface workstation 118, or in a data acquisition system 120 above or below the Earth's surface 116. In many examples, the system 120 will include a data transmitter 122 (e.g., a telemetry transmitter) to transmit acquired data values to the surface workstation 118. In some examples, logic 124 can be used to acquire and process signals received from the apparatus 100. Received data can be stored in the memory 126, in some cases as part of a database 128. Thus, many embodiments may be realized. The surface workstation 118 may also include other components as described below with respect to FIG. 2.

Figure 2:
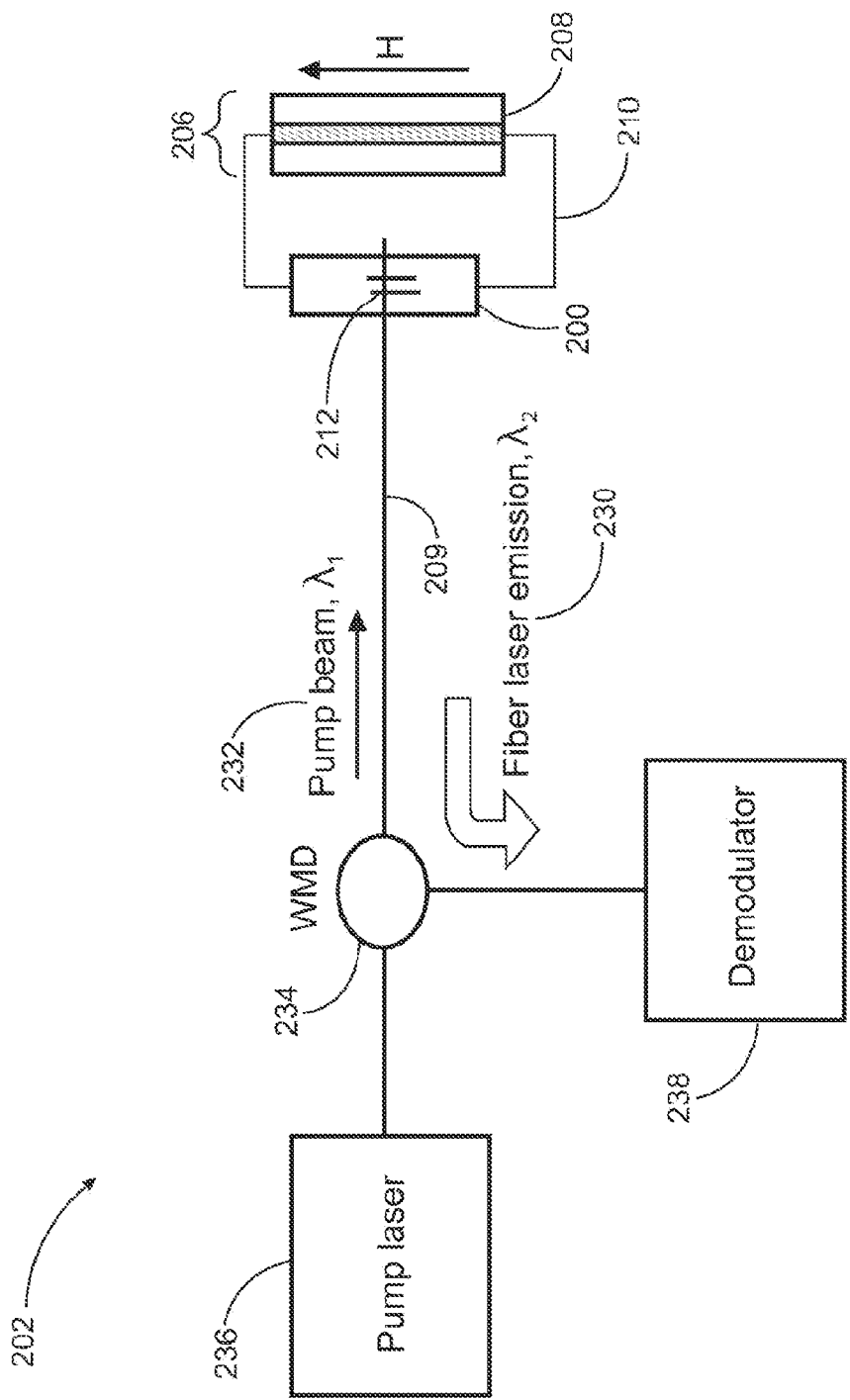
FIG. 2 is a block diagram of an example system incorporating the apparatus for monitoring the strength of a downhole magnetic field in accordance with some embodiments.

FIG. 2 is another block diagram providing another view of a system for magnetic field sensing using an ME sensor 206 coupled through an electrical connection 210 to an apparatus 200. The apparatus 200 may be operable to serve as the apparatus 100 (FIG. 1). The apparatus 200 may include a DFB fiber laser sensor 212 in accordance with some embodiments.

In example embodiments, doped fiber, for example doped fiber of the DFB fiber laser sensor 212, is pumped with a semiconductor pump laser 236 at a wavelength 232 based on the element used for the doping. For example, if the fiber of the DFB fiber laser sensor 212 is erbium-doped, the fiber may be pumped with a wavelength 232 at or near 1480 nanometers (nm). The fiber laser emission 230 wavelength is determined primarily by the pitch of the Bragg grating and can be set to be within, for example, the erbium window (1525-1560 nm). The DFB fiber laser sensor 212 may have different characteristics depending on the element with which the fiber is doped. For example, a Pr-doped DFB fiber laser sensor 212 may be pumped at about a 1-micrometer (μm) wavelength, and will lase at 1.3 μm.

As described above with respect to FIG. 1, the fiber laser emission 230 will be modulated by strain in the DFB fiber laser sensor 212. In example embodiments, a demodulator 238 may be used to demodulate the fiber laser emission 230. As is known to one of ordinary skill in the art, the signal may demodulated in one of several ways. For example, the frequency modulation of the signal can be converted to phase change via a Michelson readout interferometer. The phase may be extracted using, for example, a phase generated carrier (PGC) scheme. However, example embodiments are not limited to PGC schemes.

The demodulated lasing wavelength (or frequency) can be correlated to strain, which can in turn be correlated to the magnetic field strength measured by the ME sensor 206. A processor 114 (FIG. 1) may perform these correlations as described above with respect to FIG. 1. The magnetic field strength may then be used, for example, for monitoring flood fronts, or for time lapse monitoring of flood fronts.

Figure 3:
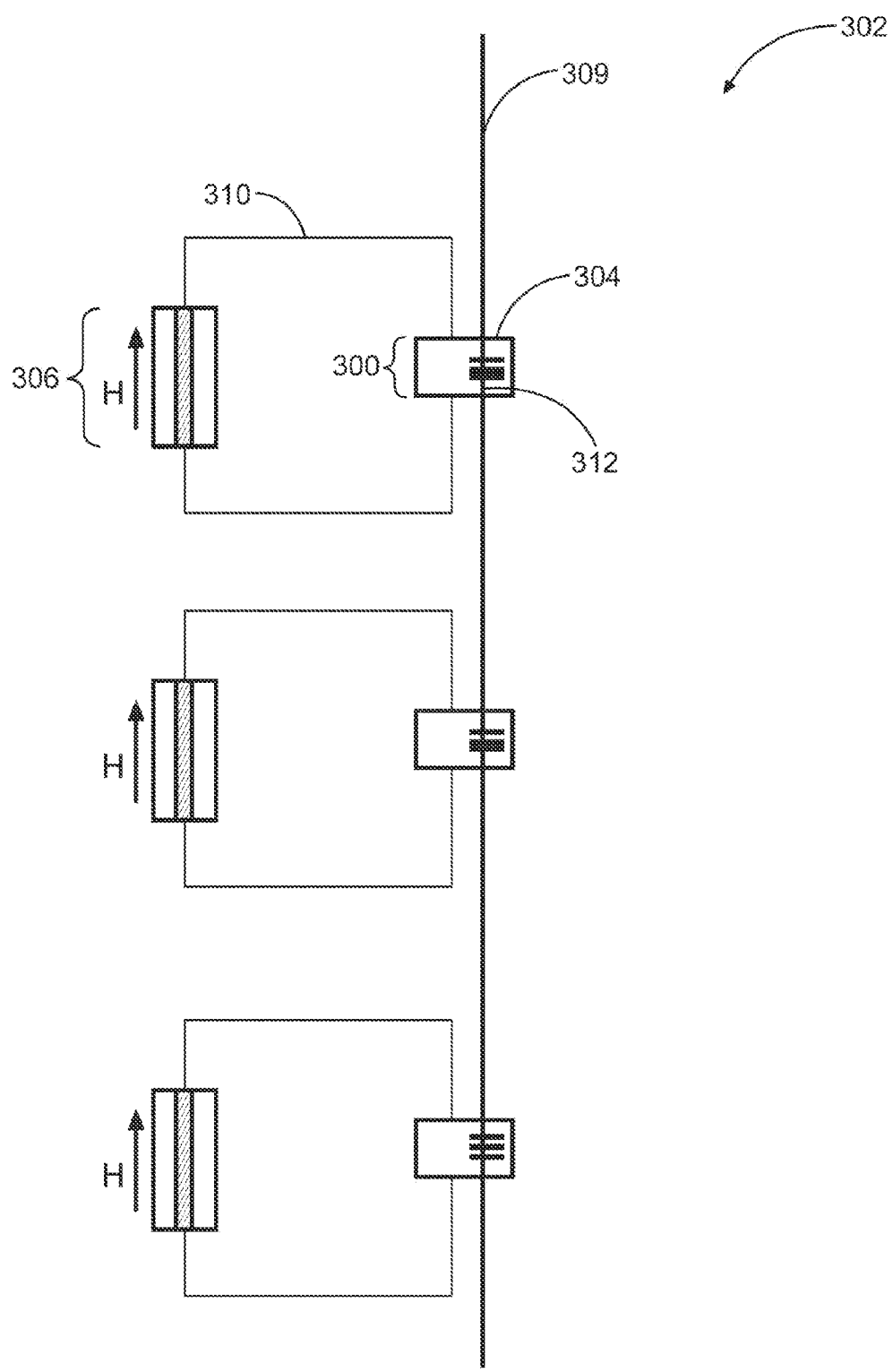
FIG. 3 is a block diagram illustrating a wavelength division multiplex (WDM) scheme in accordance with some embodiments.

Multiple DFB fiber laser sensors 212 may be multiplexed by a wavelength division multiplexing (WDM) component 234. FIG. 3 is a block diagram illustrating a WDM scheme in accordance with some embodiments.

Referring to FIG. 3, an array 302 of DFB fiber laser sensors 312 may be used to provide a multiplexed signal over the fiber optic cable 309. In a system such as this of FIG. 3, each DFB fiber laser sensor 312 is preferably designed for a specific emission wavelength so that corresponding signals from each DFB fiber laser sensor 312 may be demodulated at the surface by, for example, the demodulator 238 (FIG. 2) and correlated by the processor 114 (FIG. 1) to the magnetic field strengths measured by the ME sensors 306. As with the example of FIG. 1, each DFB fiber laser sensor 312 is bonded to a piezoelectric portion 304, and each piezoelectric portion 304 is coupled to an ME sensor 306 over an electrical connection 310.

It should be understood that the apparatus and systems of various embodiments can be used in applications other than for flood monitoring applications, and thus, various embodiments are not to be so limited. The illustrations of apparatus 100 and systems 102, 202, and 302 are intended to provide a general understanding of the structure of various embodiments, and they are not intended to serve as a complete description of all the elements and features of apparatus and systems that might make use of the structures described herein.

Figure 4:
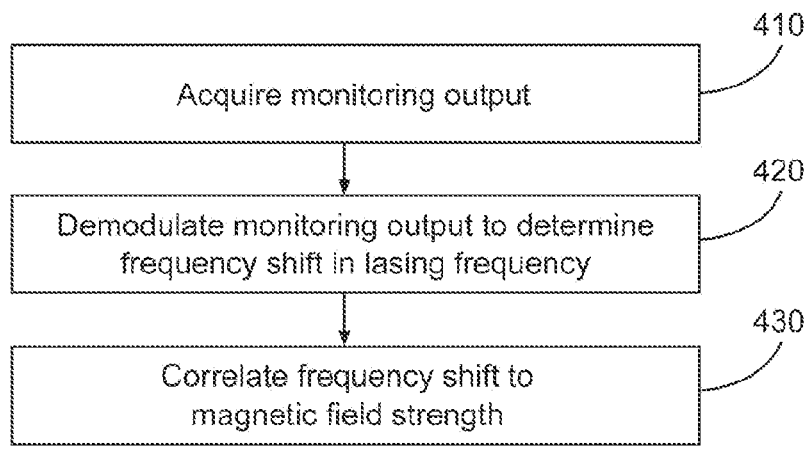
FIG. 4 is a flow chart illustrating a method for determining the strength of a downhole magnetic field in accordance with some embodiments.

FIG. 4 is a flowchart illustrating an example method 400 for determining the strength of a downhole magnetic field in accordance with some embodiments. Some steps of the method 400 may be implemented by a processor 114 (FIG. 1) or other components, such as a demodulator 238 (FIG. 2) associated with the processor 114 or workstation 118.

Example method 400 starts at block 410 with acquiring a monitoring output from a distributed feedback (DFB) fiber laser sensor, for example as depicted at 112 (FIG. 1) at least partially bonded to a piezoelectric portion 104 (FIG. 1) of a downhole device (apparatus 100, FIG. 1). A plurality of multiplexed monitoring outputs may be acquired by, for example, an array 302 of multiplexed DFB fiber laser sensors 312 (FIG. 3). As described above, the DFB fiber laser sensor 112 may be doped with a doping material including at least one of erbium, thulium, dysprosium, praseodymium, neodymium, thorium, holmium, or ytterbium. The method 400 may further comprise pumping the DFB fiber laser sensor 112 with, for example, a pump beam 232 (FIG. 2), at a wavelength determined in response to the material with which the fiber of the DFB fiber laser sensor 112 is doped.

Example method 400 continues at block 420 by demodulating the monitoring output, as described above, to determine a frequency shift in a lasing frequency of the DFB fiber laser sensor 112.

Subsequently, at block 430, the frequency shift will be correlated to a measure of magnetic field strength to determine a strength of a downhole magnetic field. In many examples, this correlation will be performed through use of one or more processors, as depicted at 114 in FIG. 1. As described above, the correlating may be based on known relationships between frequency shift, strain, and magnetic field strength.

The method 400 may further comprise storing a value representative of the strength of the downhole magnetic field, and determining a property associated with the downhole formations proximate the downhole device. This property may be representative of the resistivity of the formation. The method 400 may further include using the stored values to monitor the progress of a floodfront in a waterflooding downhole application, by comparing stored values for resistivity over time.

Figure 5:
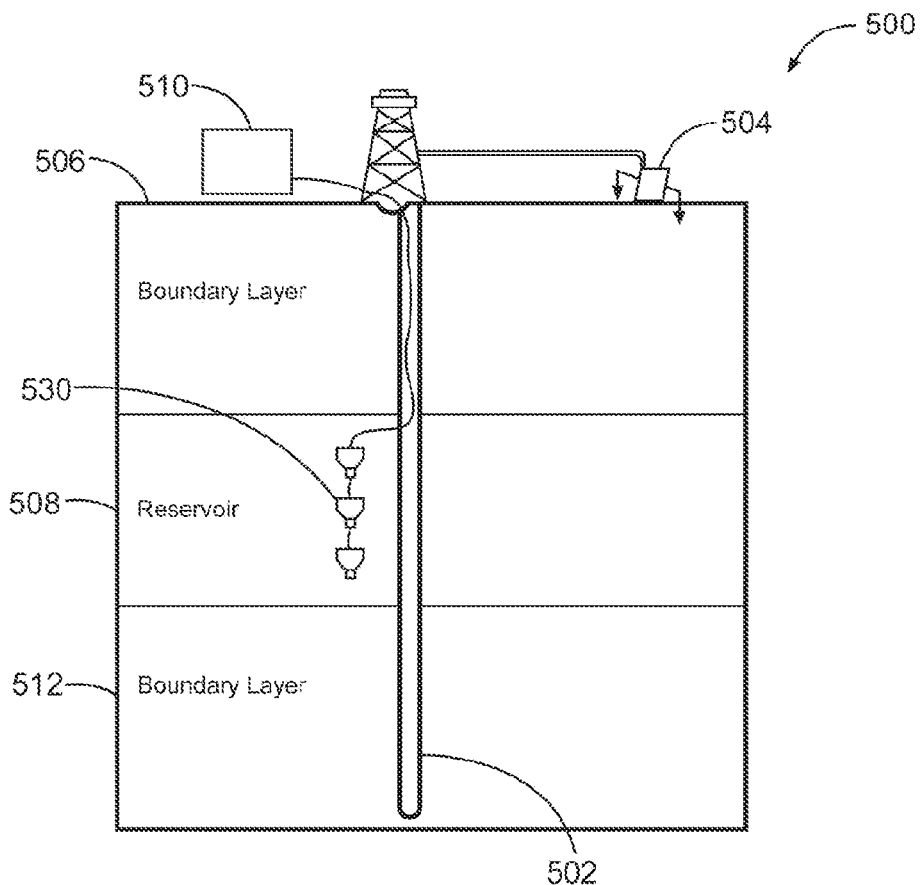
FIG. 5 illustrates a system in which example embodiments may be implemented.

FIG. 5 illustrates a system 500 for surface-to-borehole EM monitoring that may use apparatus as described previously herein with respect to example embodiments. Example 500 depicts a wellbore 502, which in various examples may be an open wellbore, or may be completed. While the well 502 is shown in a vertical orientation, the well may be in part inclined or horizontal.

Example system 500 includes a transmitter 504. While the transmitter 504 is illustrated at the surface 506, the transmitter 504 may be below the surface 506 or in the borehole 502. One or more receivers 530 (e.g., 130, shown in FIG. 1) may be deployed in the reservoir 508 to perform magnetic field measurements as described above with respect to example embodiments. While only a few receivers 530 are shown in FIG. 5, one or several arrays of receivers, each containing one or more receivers, for example an array similar to the system 302 (FIG. 3) may be deployed.

The measurement data may be communicated to a surface facility 510 for storage, processing, and analysis. The storage facility 510 may be provided with electronic equipment for various types of signal processing, which may be implemented by any or more of the components of the system 102 (FIG. 1) or 202 (FIG. 2). The measurement data may be used, for example, in time-lapse flood monitoring applications as described above.

The receivers 530 (e.g., the receivers 130, shown in FIG. 1) may be used to perform measurements on the subsurface geological formations 512 adjacent the borehole 502. The measurements may comprise magnetic field strength measurements for use in time-lapse flood monitoring as described above.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

In summary, using the apparatus, systems, and methods disclosed herein may provide multiplexable ME sensors that can survive harsh downhole environments. As a result, flood monitoring may take place more or less continuously without the need to stop production during monitoring. A combination of these advantages can significantly enhance the value of the services provided by an operation/exploration company, while at the same time controlling time-related costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
    acquiring a monitoring output from a distributed feedback (DFB) fiber laser sensor within which a Bragg grating is formed, wherein the DFB fiber laser sensor is at least partially bonded to a piezoelectric portion of a downhole device;
    demodulating the monitoring output to determine a frequency shift in a lasing frequency of the DFB fiber laser sensor; and
    correlating the frequency shift to a measure of magnetic field strength to determine a strength of a downhole magnetic field.

2. The method of claim 1, wherein
the DFB fiber laser sensor is doped with a doping material including at least one of erbium, thulium, dysprosium, praseodymium, neodymium, thorium, holmium, or ytterbium, and
the method further comprises pumping the DFB fiber laser sensor at a wavelength based on the doping material.

3. The method of claim 2, wherein the correlating is based on the doping material.

4. The method of claim 1, further comprising:
acquiring a plurality of multiplexed monitoring outputs from a plurality of DFB fiber laser sensors; and
demodulating at least one of the plurality of multiplexed monitoring outputs.

5. The method of claim 1, wherein
the shift in lasing frequency is caused by a mechanical strain in the piezoelectric portion, and
the mechanical strain is proportional to a measure of magnetic field strength sensed by a magnetoelectric sensor coupled to the piezoelectric portion.

6. The method of claim 1, further comprising determining and storing a resistivity value for an underground formation proximate the downhole device based on the determined magnetic field strength.

7. An apparatus, comprising:
a piezoelectric portion configured to receive an electrical signal from a magnetoelectric (ME) sensor, a magnitude of the electrical signal being proportional to a strength of a magnetic field detected by the ME sensor; and
a distributed feedback (DFB) fiber laser sensor, attached to the piezoelectric portion, configured to detect a strain induced by the electrical signal in the piezoelectric portion and to generate an optical signal based on the strain.

8. The apparatus of claim 7, wherein the DFB fiber laser sensor includes a fiber that is doped with a material, the material including at least one of erbium, thulium, dysprosium, praseodymium, neodymium, thorium, holmium, or ytterbium.

9. The apparatus of claim 8, wherein the fiber is pumped at a wavelength, the wavelength based on the material with which the fiber is doped.

10. The apparatus of claim 7, wherein the piezoelectric portion is arranged in a stack configuration.

11. The apparatus of claim 7, wherein the piezoelectric portion is a piezoelectric portion of a downhole device, and wherein the DFB fiber laser sensor is configured to detect a strain induced by the electrical signal in the piezoelectric portion and to generate a modulated optical signal based on the strain, said apparatus further comprising:
a demodulator that demodulates the modulated optical signal to determine a frequency shift in a lasing frequency of the DFB fiber laser sensor; and
a data processing system coupled to the DFB fiber laser sensor by a fiber optic cable, the data processing system configured to,
correlate the frequency shift to a measure of magnetic field strength to determine a strength of a downhole magnetic field; and
store a resistivity value for an underground formation proximate the downhole device based on the determined magnetic field strength.

12. The method of claim 11, further comprising:
storing resistivity values representative of downhole magnetic field strengths in a table; and
monitoring progress of a floodfront in a waterflooding downhole application by comparing the stored resistivity values to determine resistivity over time.

13. The apparatus of claim 7, wherein the piezoelectric portion is arranged in a cylindrical configuration.

14. The apparatus of claim 7, wherein the DFB fiber laser sensor is further configured to couple to a fiber optic cable for transmission of the optical signal.

15. A subsurface electromagnetic field monitoring system, comprising:
a first magnetoelectric (ME) sensor;
a first distributed feedback (DFB) sensor block, including
a piezoelectric portion configured to receive an electrical signal from the first ME sensor, and
a DFB fiber laser sensor attached to the piezoelectric portion and configured to detect a strain in the piezoelectric portion; and
a fiber optic cable coupled to an output of the DFB fiber laser sensor and configured to provide
a monitoring output representative of a lasing frequency of the DFB fiber laser sensor.

16. The system of claim 15, further comprising:
a second DFB sensor block, and wherein the fiber optic cable is configured to multiplex the outputs of the DFB sensor block and the second DFB sensor block; and
a second ME sensor coupled to the second DFB sensor block.

17. The system of claim 15, further comprising:
a processor configured to receive the monitoring output and correlate the monitoring output with a measure of magnetic field strength.

18. The system of claim 15, wherein the first ME sensor comprises:
a piezo-fiber layer having piezo-electric fibers extending in a longitudinal direction; and
first and second magnetostrictive layers, the piezo-fiber layer being laminated between the first and second magnetostrictive layers.

19. The system of claim 15, wherein the DFB fiber laser sensor is doped with a material, the material including at least one of erbium, thulium, dysprosium, praseodymium, neodymium, thorium, holmium, or ytterbium.

20. The system of claim 19, further comprising:
a pump laser configured to provide a pump beam compatible with the material with which the DFB fiber laser sensor is doped.

21. The system of claim 15, wherein the piezoelectric portion is arranged in a cylindrical configuration.

22. The system of claim 15, wherein the piezoelectric portion is arranged in a stack configuration.

* * * * *